United States Patent [19]

Noble et al.

[11] Patent Number: 5,657,046

[45] Date of Patent: Aug. 12, 1997

[54] VIDEO MOVING MESSAGE DISPLAY

[75] Inventors: Paul Noble, New York, N.Y.; Richard Geyer, Keyport, N.J.

[73] Assignee: Imtech International, Inc., Denville, N.J.

[21] Appl. No.: 231,431

[22] Filed: Apr. 20, 1994

Related U.S. Application Data

[63] Continuation of Ser. No. 982,053, Nov. 25, 1992, abandoned, which is a continuation of Ser. No. 570,914, Aug. 21, 1990, abandoned, which is a continuation of Ser. No. 436,421, Nov. 14, 1989, abandoned.

[51] Int. Cl.$^6$ ........................................... G09G 5/34
[52] U.S. Cl. ................................. 345/123; 345/1
[58] Field of Search ........................ 345/1, 123, 2, 345/3

[56] References Cited

U.S. PATENT DOCUMENTS

| | | | |
|---|---|---|---|
| 4,112,423 | 9/1978 | Bertolasi | 345/1 |
| 4,698,664 | 10/1987 | Nichols et al. | 345/145 |
| 4,746,981 | 5/1988 | Nadan et al. | |
| 4,884,068 | 11/1989 | Matheny et al. | 345/180 |
| 4,943,866 | 7/1990 | Baker et al. | 340/724 |
| 4,999,709 | 3/1991 | Yamazaki et al. | 340/724 |
| 5,021,772 | 6/1991 | King et al. | 340/726 |

Primary Examiner—Mark R. Powell
Assistant Examiner—Matthew Luu
Attorney, Agent, or Firm—Darby & Darby

[57] ABSTRACT

A video moving message system in which images are shifted one pixel width at a time from one video monitor to another. The video monitors are arranged side by side and/or stacked one over the other. Row and column counters are reassigned for a video read only memory matrix so as to enable accessing of image data stored in the read only memory through these reassigned counters. The image data is read out and sent to pixels on the video monitors which correspond to the row and counter addresses in the read only memory matrix. By reassigning during each blanking interval of a video monitor, the image on the video monitor appears to shift by at least one pixel width on the video monitor. The image is scrolled from one video monitor to the next in succession.

14 Claims, 9 Drawing Sheets

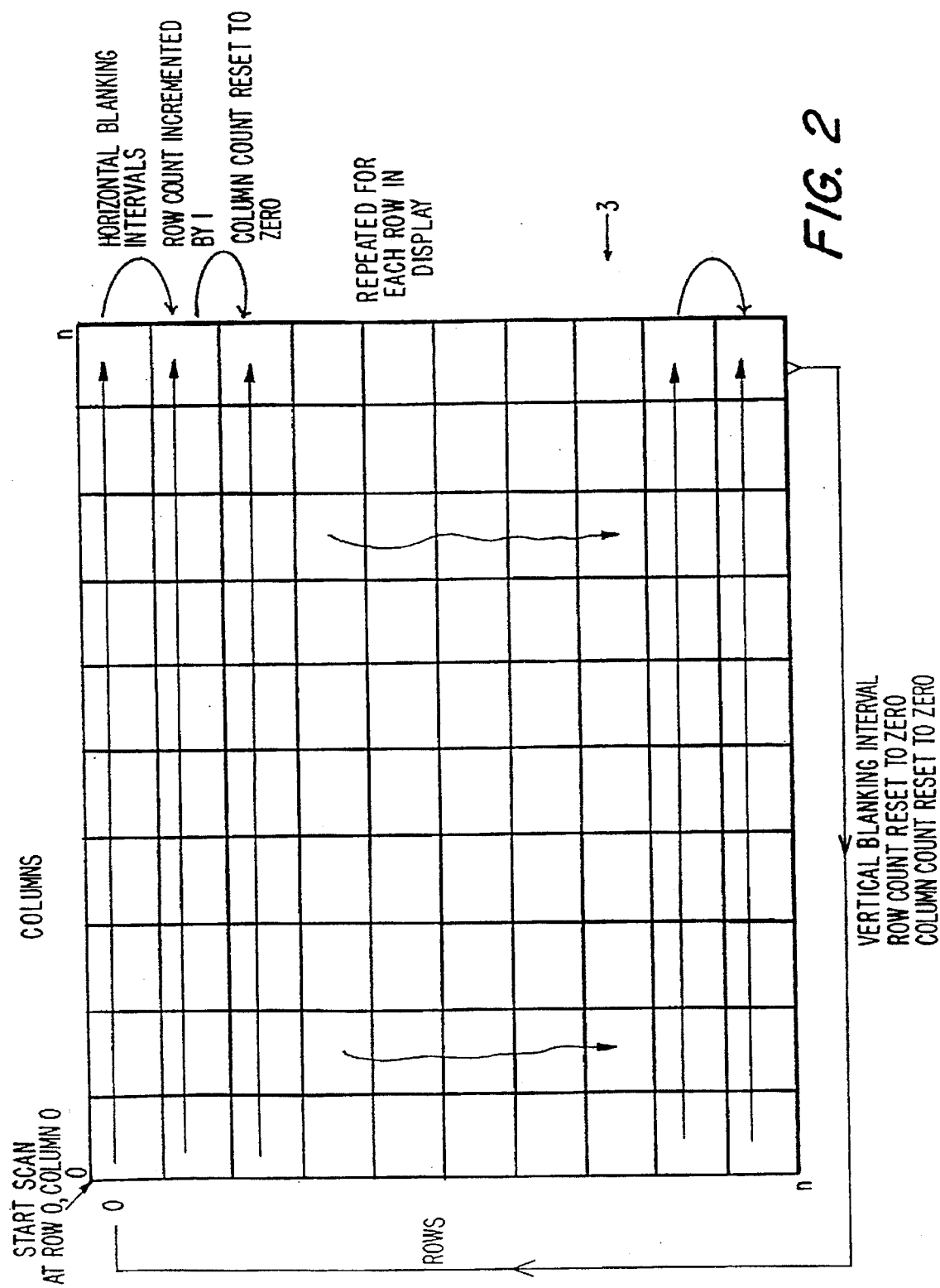

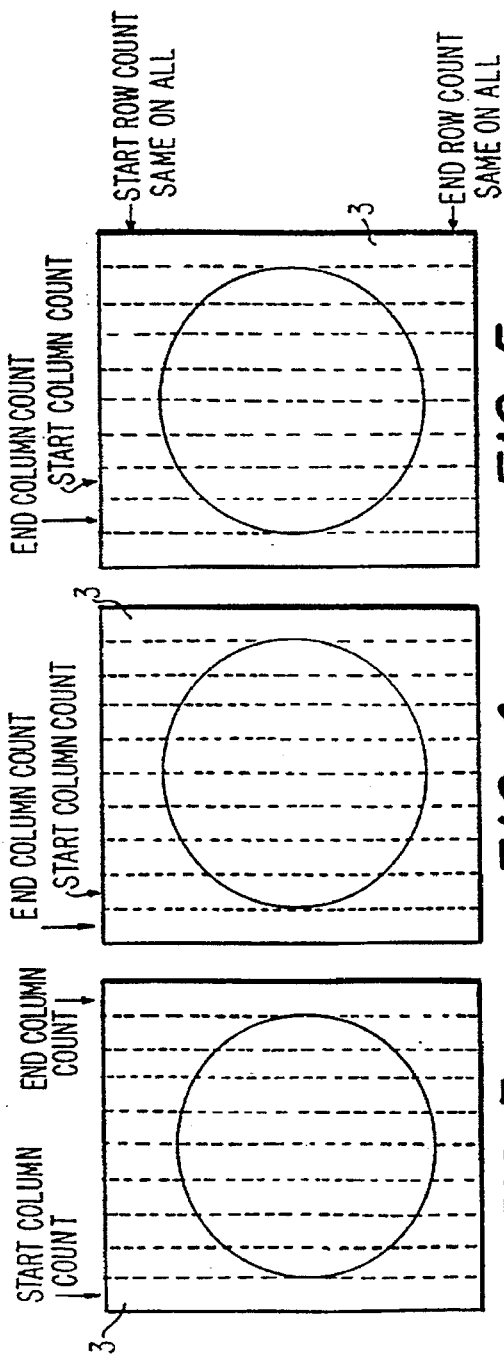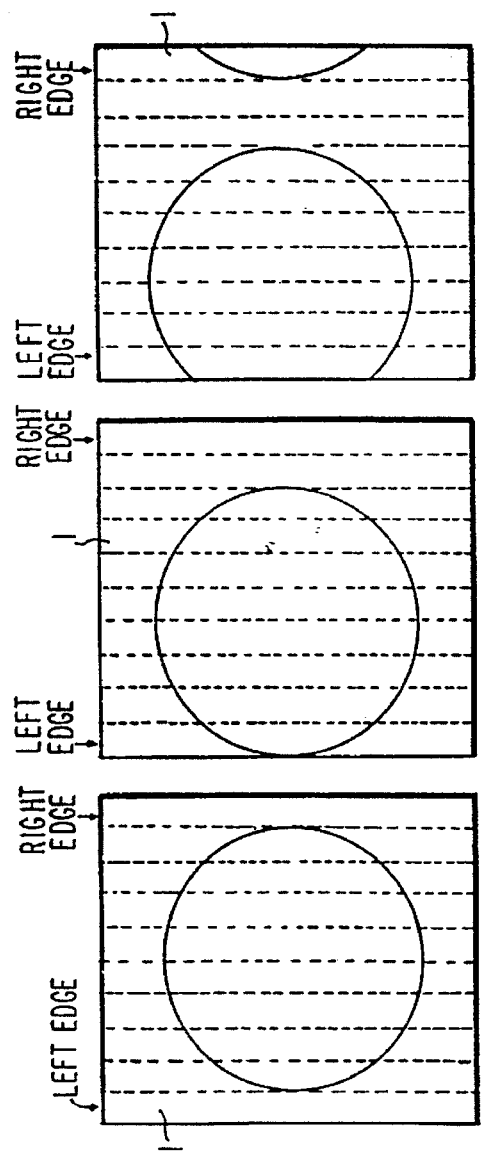

VIDEO MOVING MESSAGE DISPLAY

CROSS-REFERENCE TO PATENT APPLICATIONS

This is a continuation of application Ser. No. 7/982,053 (now abandoned), filed Nov. 25, 1992, which is continuation of Ser. No. 7/570,914, filed Aug. 21, 1990 (now abandoned), which was a CIP of Ser. No. 7/436,421 filed Nov. 14, 1989 (now abandoned).

BACKGROUND OF THE INVENTION

A moving message display method and apparatus is described in U.S. patent application Ser. No. 436,421 filed Nov. 14, 1989 and U.S. patent application Ser. No. 419,094 filed Oct. 10, 1989, both of which are commonly owned by the assignee of the present application. The teachings of both of these applications are incorporated herein by reference.

U.S. Pat. No. 4,746,981, also assigned to the same assignee, discloses the use of a plurality of stacked television receivers or monitors to display a larger composite image. It is directed to overcoming a problem which arises from improper spatial presentation of lines due to interlace. U.S. patent application Ser. No. 419,094 provides a technique which minimizes the unpleasant effect arising from blanking lines.

From the teaching of U.S. Ser. No. 436,421, moving message display systems are limited by a fixed number of monitors, as exemplified by forming a composite image across a fixed number of stacked monitors. That is, the controlling software which transfers an image from one monitor to the next must be customized for some upper limit of monitors. Adding additional monitors to the message display system beyond this upper limit is troublesome, insofar as the software needs modification to accommodate the larger number of monitors.

In addition, the image is expanded and then split up across all the fixed monitors. Any variation in the number of monitors must be accommodated by the software and, further, the resolution of the image displayed is not as good as it would be if the image were not expanded but rather displayed for the size of a single monitor.

Further, changing the stacking relationship of the monitors would require revising the software to expand the image to conform to the revised stacking relationship. For instance, if four monitors are side by side and their stacking is changed to form a square, the expanded image will need to be changed as well by software. In addition, expanding the image to a larger size means that the central graphics computer must be that much faster to keep track of and process the expanded images. Unfortunately, there is a further limit to the amount of data that can be handled by a computer at its fastest processing speed. This limits the number of monitors which may be utilized in an array.

It would therefore be desireable to provide a video moving message system which may accommodate any number of monitors without requiring modification of software, such modification being otherwise required to change the upper limit of the number of monitors capable of being handled by the software. It would further be desirable to improve the resolution of the image displayed on all monitors to that which would arise if the image were displayed by a single monitor.

SUMMARY OF THE INVENTION

The present invention is directed to a video moving message display system composed of a series of self contained image display modules. Each module is composed of a microcontroller, video memory, row and column counters, memory digital to display analog converters and a display monitor or other video display device (VDD). There is still image data stored in a matrix in memory and it is accessible via the counters which provide row and column addresses in each individual module. The image data is read out of memory and displayed as an image at corresponding pixels of a monitor screen. The counters are then adjusted during a blanking interval of the monitor, which causes the image to appear to shift on the monitor screen after the reassignment as the image data is displayed on the monitor.

Preferably, a series of monitors are arranged side by side or one over the other so that the image data is scrolled from one monitor to the next. By arranging the monitors both side by side and one over the other, the image data may be scrolled from one monitor to the next either up and down or left and right.

A complete scrolling system may be obtained with one graphics generating computer at the head end of a series of video display modules. The graphics computer should be capable of generating streams of video text and/or images as a sequence of single still video images or pages. By serializing these pages one row or column at a time and transmitting the pixelized data to the first video display module in the sequence, the series of modules in sequence may appear to depict one single and fluid moving image as a whole.

Alternatively, each individual video display module may be capable of generating a preprogrammed sequence of graphics screens which may be sequenced and controlled by a master computer or module through the serial links.

The present invention is also directed to a video moving message display system and method which includes a plurality of monitors, means for supplying image data, and a plurality of video modules in communication with the display monitors, respectively, and with each other in cascade.

The image data is transferred between the video modules in succession either by the means which supplies the image data or independent of it, i.e., transference is done by the video modules themselves. An image is generated based on the image data and is displayed on the video monitors and scrolled from one display monitor to the next successively. An image is transferred from one monitor to the next independent of the number of monitors present in the moving message system.

In this manner, the number of video monitors employed may be varied at will and the resolution of the image being displayed is that for a single monitor since the image stored in memory is shown on a single monitor and scrolled from one to the next, rather than expanding an image from memory to fit the entire display across multiple monitors.

Expansion of the image stored in memory may therefore be avoided. Resolution and graphic of the image on each monitor is the same as that for the graphic computer source. By serially linking the monitors there is no real limit to the number of monitors which may be used in any array, because the image is scrolled across each monitor independent of the graphic computer source. That is, each video module is capable of transferring the image data to the next video module in succession on its own.

BRIEF DESCRIPTION OF THE DRAWINGS

For a better understanding of the present invention, the scope of the invention is set forth in the appended claims and reference is made to the following description and accompanying drawings, of which:

FIG. 2 is a schematic representation of a video display for normal scanning.

FIGS. 3–5 are schematic representations of a video image as stored in random access memory in accordance with the invention.

FIGS. 6–8 are schematic representations of the video image of FIGS. 3–5, respectively, on a monitor screen after horizontal scrolling by manipulating column display counters in accordance with the invention.

DESCRIPTION OF THE PREFERRED EMBODIMENT

Figure 1:
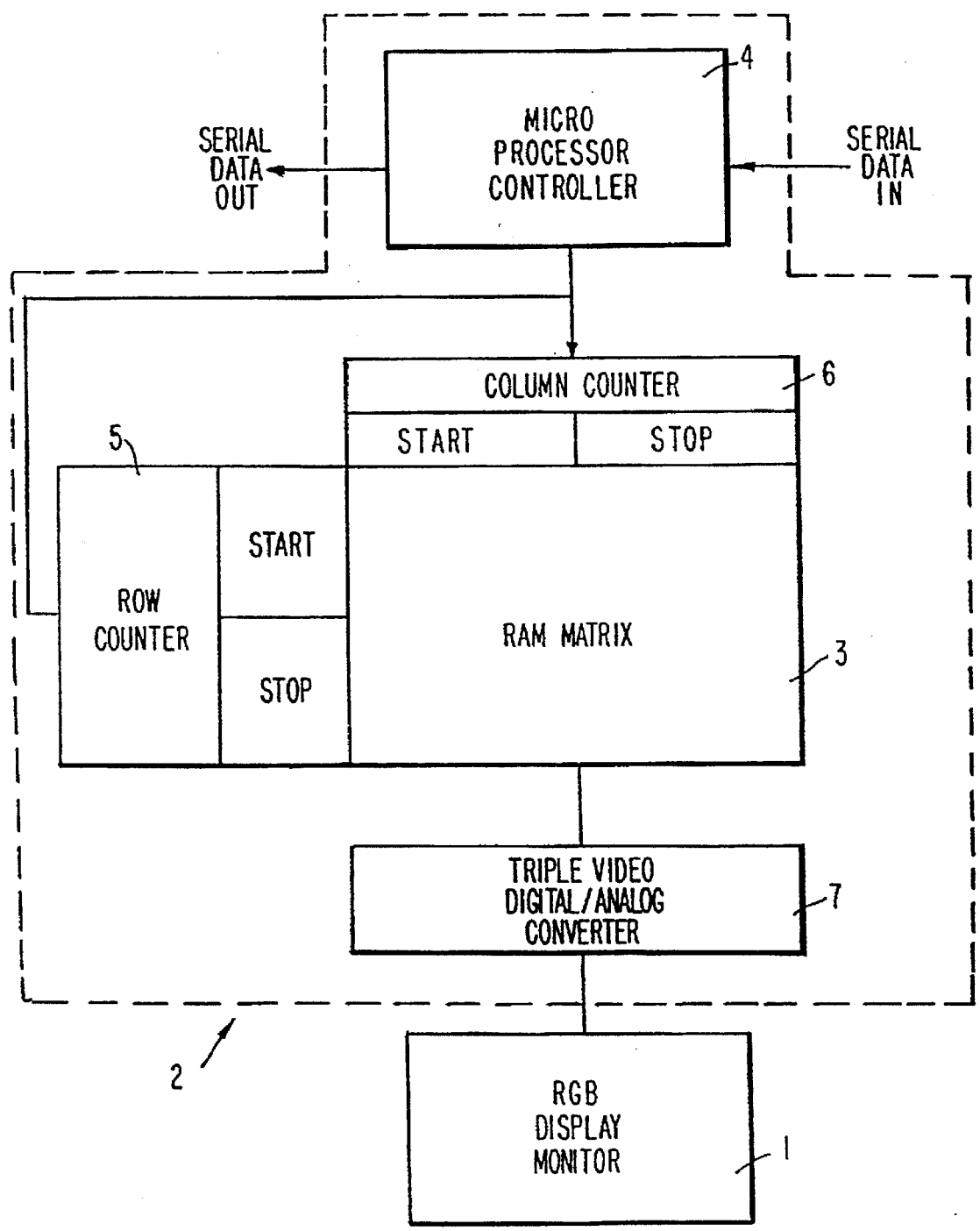
FIG. 1 is a block diagram of a video scrolling module with video monitor in accordance with the present invention.

FIG. 1 is a block diagram of a video scrolling module with video monitor, which includes a standard analog RGB (red, green, blue) video monitor 1 with an attached hardware processing unit 2. The hardware processing unit 2 contains a block of video displaying random access memory (RAM) 3, a microprocessor control unit 4, random access memory counters 5,6 for row and column, and three digital to analog converters 7 to drive the three color guns of the RGB video display monitor 1. FIG. 1 shows the direction of serial data entering and leaving the microprocessor control unit 4, which serializes this data as image data stored within a matrix represented by columns and rows in RAM 3. The image data is in the form of binary code, i.e., in digital form.

A video module is capable of storing and displaying one complete static video frame continuously. The video RAM in each module is arranged in a two dimensional matrix with x and y coordinates matching the same coordinates on the monitor screen such that each pixel location on the monitor screen is stored in a corresponding location in RAM memory. Color graphic images may be stored by several different methods. The most common method is to store within an RGB display system where each pixel is stored as separate red, green and blue component. Any pixel color may be created by mixing the appropriate quantities of red, green and blue. Other methods include storing each pixel as digitized composite video, chrominance and luminance, color difference signals or other color component schemes. Any of these methods may be used for color image encoding in the moving message system; it is advantageous to use the same method used in the source graphics computer.

In an RGB graphics based system, each display module has three identical matrices of RAM, one for each color. Each color component is stored in RAM as a number that represents the percentage of that color in a respective pixel location. The number of bits of RAM data used to store each of the RGB components determines the maximum number of different color combinations (palette) available for each pixel. Each video module preferably uses 8 bits to store each of the RGB components, giving over 16 million possible color combinations. Other data widths are possible for use with different qualities of graphics generators. The video display RAM is accessed through two sets of programmable address counters 5,6, one counter 5 for the matrix row address and one counter 6 for the matrix column address.

Display pixel resolution is determined by several factors. Horizontal pixel resolution is governed by the system digitizing clock rate. A higher system clock will result in more pixels per line. The number of pixel lines per screen is determined by the horizontal scan rate. A majority of applications may use video monitors that require an NTSC scan rate of 15.7 KHz, giving video fields of 262.5 lines each. Of the 262.5 lines, only approximately 240 in each field are visible on the monitor face. In normal broadcast television NTSC, each video frame is composed of two interlaced fields which are displayed a sixtieth of a second apart to compose one frame of 525 lines, thirty times a second.

Many graphic video systems use a normal NTSC scan rate but output a noninterlaced video image. To achieve this, the same video field is shown twice in a row with no offset between them giving a visual image of approximately 240 lines.

The hardware description following uses a clock rate of 7.159 MHZ, which gives a pixel width of approximately 14 microseconds and 360 pixels per line. Higher horizontal resolution is achieved by increasing the clock rate. An NTSC sync generator is used to produce a noninterlaced display of 240 lines. Normal interlaced video or images of greater than 240 lines may be displayed by the addition of more video RAM, and adjusting the horizontal scan rate.

Each frame is displayed or transferred from the video RAM 3 to the monitor 5 thirty times a second. By incrementing the column address counter 6 once for each output pixel, the video RAM 3 is read from left to right along each row. At the end of each row except the last row, the column address count is reset to the first column and the row address counter is incremented by one. At the end of the last row, both the column address and the row address counters are reset back to the first RAM address to start another frame scan as illustrated in FIG. 2.

For the sake of clarity and simplification, FIGS. 2–8 illustrate an application for a video module with a resolution of ten horizontal columns and ten vertical rows. In practice, however, the resolution may be at least 360 horizontal by 240 vertical pixels. The principles discussed for the 10×10 pixel matrix resolution are equally applicable to the 360× 240 pixel matrix resolution.

Both the row and column counters are programable to start address, stop address, and length of count sequence. The counters can be set to roll over back to zero count when a preset maximum count is reached. By manipulating the column start and stop address counters during an active display period, a complete image which is stored and centered within the video RAM matrix will shift its position to the left or right relative to the monitor screen and the image edges roll around to the opposite side of the display monitor as seen in FIGS. 3–8. By manipulating the row start and stop address counters, such a complete image shifts its position up or down relative to the monitor screen with the image going over the top edge and appearing on the bottom and vice versa.

FIGS. 3–5 show a video image as stored in the random access memory matrix. FIG. 6 shows the same image as displayed on the RGB video display monitor 7 without any shift by columns or rows. FIG. 7 shows that by reassigning the end and start column counts to the right as in FIG. 4 in comparison to that of FIG. 3, the video image is shifted by columns to the left as compared to the unshifted video image of FIG. 6. FIG. 8 shows that by reassigning the end and start column counts further to the right in FIG. 5 as compared to that of FIG. 4, the video image is shifted further to the left as compared to that of FIG. 7. It should be readily apparent that reassigning the end and start column counts in the reverse direction (to the left), the video image displayed shifts to the right. Similarly, reassigning the end and start row column counts up causes the displayed video image to shift down and reassigning the end and start counts down causes the displayed video image to shift up.

All changes in row or column address counters 5, 6 are preferably effected during either the horizontal or vertical blanking intervals so there is no noticeable jitter or tearing of the video image. Further, changes in either count sequence affect the entire displayed image so the counters should be changed only during a vertical blanking interval.

The microcontroller within each video module has the ability to read or write any RGB data byte within the video RAM matrix. Although any byte might be read or modified at any time, only the pixel data along a leading or trailing edge would be operated on.

To make an image scroll from right to left across a monitor screen, the RAM display column counters are incremented one or more pixel counts at a time in between normal display periods.

The speed of scrolling is dependent on the frequency at which the display counters are updated. A 360 pixel wide display at a rate of 60 displays per second would require the pixel address counters be incremented (or decremented) by 6 during each vertical retrace in order for an image to scroll completely across the screen in one second. Changing the counters by 3 during each vertical retrace would give a two second scroll time, changing by 1 a six second time and so on.

In order for a video image to transpose from the left most column edge of one display to the right most column edge of the next monitor, the corresponding pixel data must be copied from one video module to the next.

During a scrolling interval, the microcontroller in each video module reads the pixel data along the left most column of the current image, converts them into a serial data stream and transmits the data to the next module to the left through an RS422 serial link. At the same time, serial data from the next Video module to the right is arriving through a second RS422 serial link. This data is assembled into RGB pixel data bytes and stored along the right most column edge of the current image. The serial data rate is application specific and is determined by the maximum speed at which the image must be scrolled across.

Figure 9:
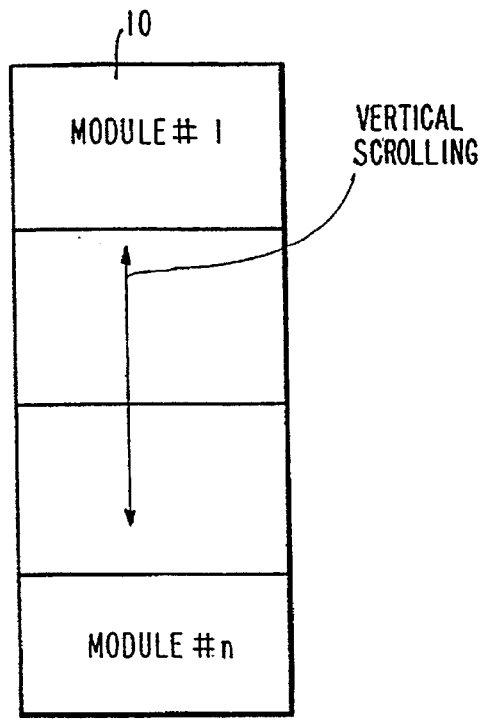
FIGS. 9 and 10 are schematic representations of vertical and horizontal scrolling modes, respectively.
Figure 10:
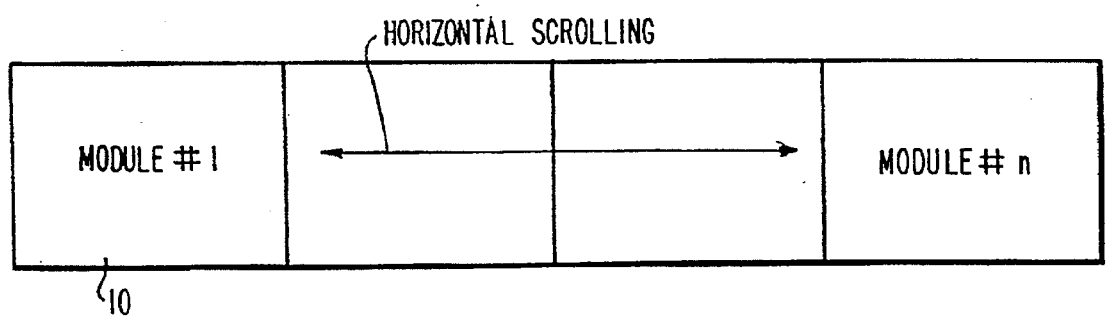

Based on the foregoing discussion regarding image shifting, a video moving message display system composed of any number of video modules stacked horizontally side by side may be employed in which the video frames may be shifted or scrolled linearly left or right by one or more pixel rows, from one module to the next in sequence as illustrated in FIG. 9. The entire display may be stepped left or right in increments of one pixel resolution. Similarly, by stacking the modules vertically on top of each other, a similar effect is achieved by shifting or scrolling the video images up or down by one pixel line as illustrated in FIG. 10. The modules of FIGS. 9 and 10 may be combined to enable scrolling both horizontally and vertically from one module to the next in succession.

Figure 15:
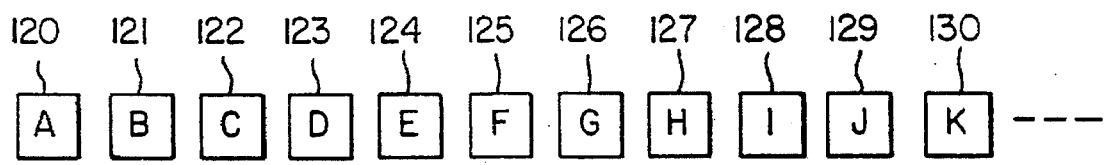
FIGS. 15–17 depict sequentially the movement of images in a linear display, for example, of the type depicted in FIG. 10, in accordance with the invention.
Figure 16:
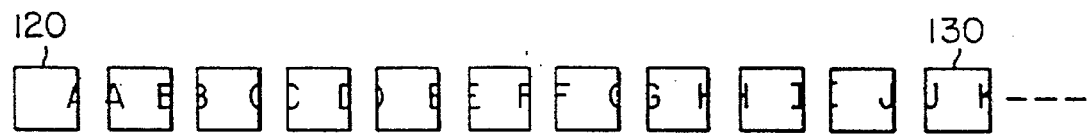
Figure 17:
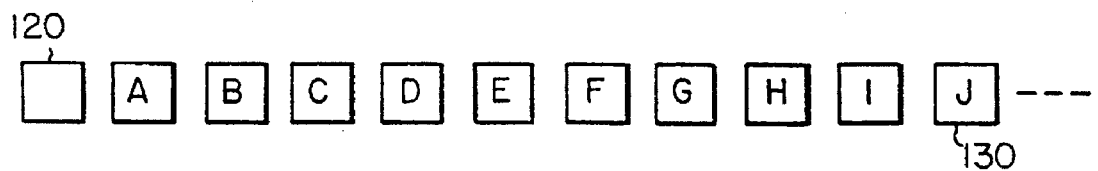

FIGS. 15–17 depict the sort of moving display that could be obtained in an apparatus of the type described in FIG. 10. The blocks 120–130 represent the portions of an overall image displayed in different video monitors. In the disclosed embodiment, the overall image is made up of the letters A–K and is larger than the width dimension of an individual monitor when the overall image fits one of the monitors in height. FIGS. 15–17 depict sequential points in time, with the overall image shifting or scrolling to the right or along the width dimension of the monitors. Similarly, the device represented in FIG. 9 would achieve a vertically scrolling overall image which fits the monitors in the width dimension, but is larger than the display capacity of a monitor in the height dimension.

There is a finite period of about 1.33 milliseconds of vertical blanking time during which the complete memory transfer is to be accomplished between modules in sequence. For this reason, it is fortuitous in the preferred embodiment that visual shifting of the image by one pixel column may be implemented by changing memory address counters so that only one column of data on each edge of the video needs to be changed for one pixel scrolling of the image. Of course, it is also within the scope of the invention to visually shift the image by two or more pixel columns or rows at a time. If such a transfer is effected within the vertical blanking time interval, the transition of the image as viewed from one video monitor to the next may appear to jump by the block of pixels during each vertical blanking time interval. The visual shifting of an image within memory could also be produced by a computer memory management unit, a graphics coprocessor, or by moving every byte in the memory array individually.

Figure 11:
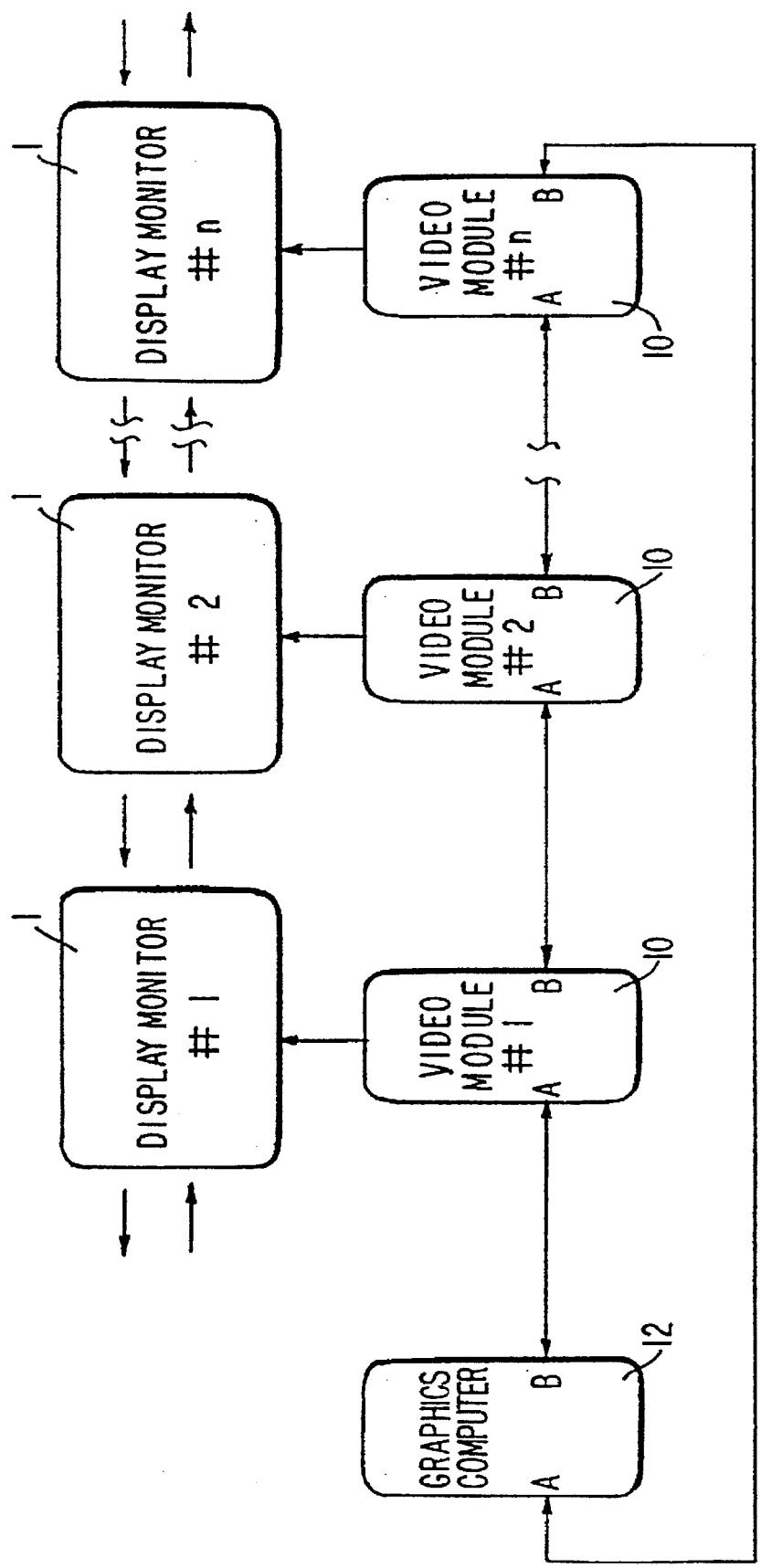
FIG. 11 is a block diagram of the overall arrangement of multiple video scroll modules interconnected with each other, each video scroll module being of the type of FIG. 1.

FIG. 11 depicts the overall arrangement of multiple video scrolling modules of the type of FIG. 1 interconnected with each other. There is one graphics computer 12 and a plurality of video modules 10 arranged in cascade. Each video module 10 constitutes the hardware processing unit 2 of FIG. 1 and controls the display of a respective display monitor 1.

A video graphics source for the entire chain of video modules 10 is provided by the graphics based computer 12, which contains a display memory in a similar format to each display module. In the preferred embodiment far RGB, there are 360×240 pixels. For this hardware description, an Amiga 2500 computer is satisfactory. This graphics computer 12 builds and stores digitized video images in an internal set of RAM matrices. By serializing the digital image data and transmitting it directly through an RS422 serial link to the first module of the scrolling array, it is not necessary to digitize an analog video signal. This eliminates some extra hardware and one source of possible image distortion.

A single data link which chains one video module 10 to the next may be employed to maintain the video moving message system of the present invention. Both pixelized video data and module control commands may be passed through the same links.

Figure 12:
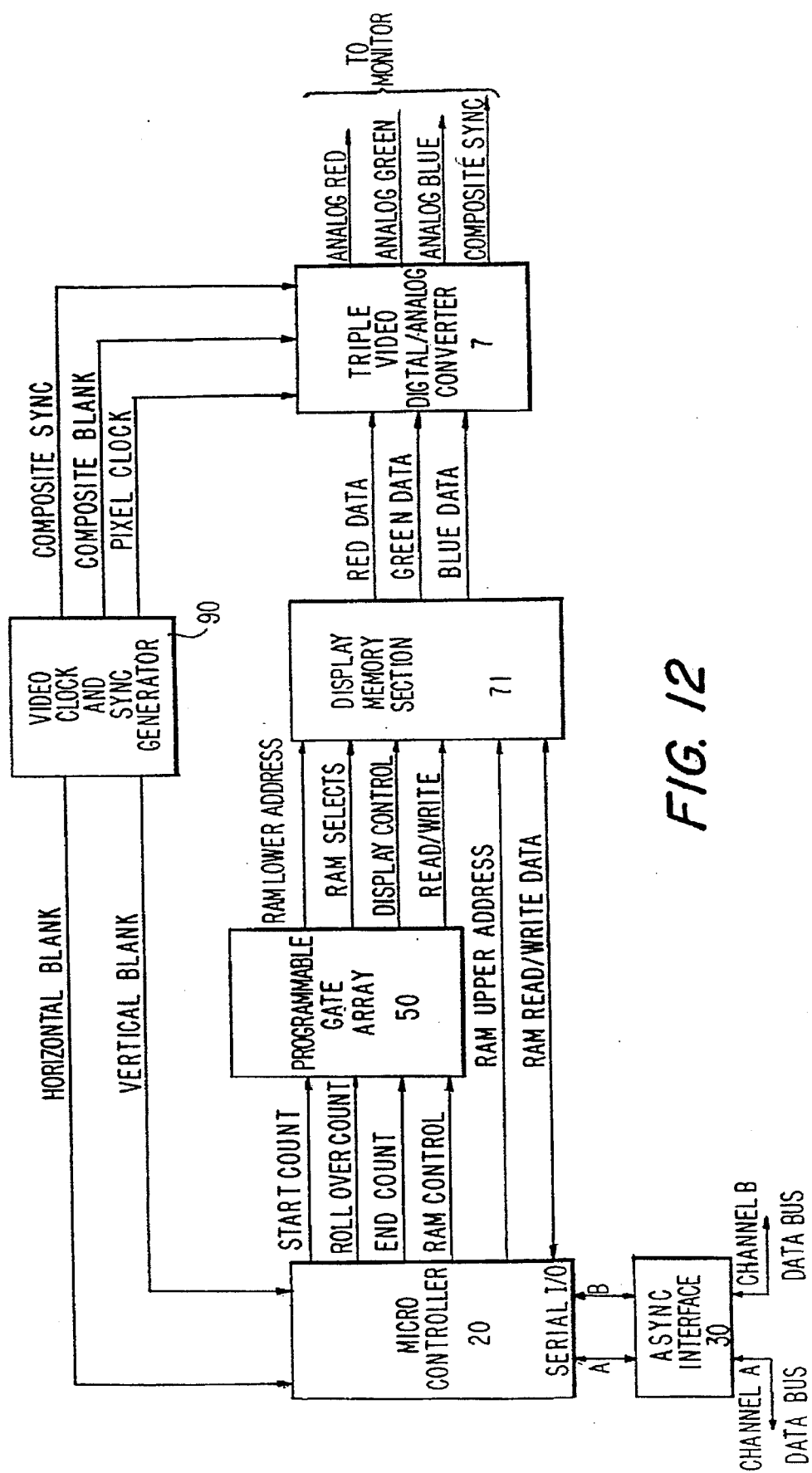
FIG. 12 is a block diagram of each video module of FIG. 11.

FIG. 12 shows a preferred video module 10 internal layout. There is a microcontroller 20, asynchronous interface 30, programmable gate array 50, a display memory section 71, triple video digital to analog converter 7, a video clock and sync generator 90, and interconnections between the components.

The asynchronous interface 30 buffers serial data from ASC0 and ASC1 through serial current drivers and receivers to provide an IEEE RS422 serial link between successive video modules 10. Again, other serial or parallel protocols may be used as dictated by speed requirements. Interface 30 may be in the form of two interfaces, e.g., a Motorola MC3487 with serial current drivers and a Motorola MC3486 with serial current receivers.

Thus, one of two successive video modules 10 may be considered to be interfacing data bidirectionally via channel A with respect to one serial current driver and receiver and the other. Of the two successive video modules 10 interfaces data bidirectionally via channel B with respect to another serial current driver and receiver. The successive video modules communicate with each other using digital binary coding.

The microcontroller 20 communicates with the video modules 10 via the asynchronous interface 30 bidirectionally through corresponding channel A and B lines. Baud rate and data parameters may be controlled by software.

Microcontroller 20 may be a Hitachi HD647180X microcontroller, which is a self contained computer on a chip. Contained within this device is a microprocessor, instruction control ROM, internal work RAM, two asynchronous serial ports, and 54 general purpose parallel input/output lines. The HD647180X provides all of the control functions needed for the microprocessor control unit 4 of a scrolling message display module. Both asynchronous serial ports may be configured as eight data bits and 44,700 baud. Of course, the microcontroller may also be a personal computer or any other computer system.

The video clock and sync generator includes a video sync generator and a buffered 14.31818 MHZ system clock generated by a crystal oscillator attached to the video sync generator 24. Internally, the microcontroller 20 divides the 14 MHz system clock by 2 to provide a 7 MHz operations clock. The 7 MHz is further divided down within the microcontroller 20 by a factor of 160 to generate a 44.74 khz baud rate clock oscillator, which is accrued via the two asynchronous serial ports of the microcontroller 20.

Two hardware interrupts may be used to signal the microcontroller 20 of the start of vertical blank drive and horizontal blank drive, respectively, which originate at the video sync generator. When activated, the interrupt lines cause the execution of the appropriate blanking operations in the controller software. The vertical interrupt always has highest priority.

Parallel input/output lines of the microcontroller 20 are configured to control access to the video display RAM 3. Control lines are grouped as eight bit bidirectional ports. Three ports set parameters for the pixel column counter. Another port forms the input for the display RAM chip select decoders. Another six ports form the upper six address lines for the display RAM. Another port forms the display RAM bidirectional data buss. Motorola 74F244 line drivers may be used to boost all signals going to multiple video display RAMs in parallel.

Figure 13:
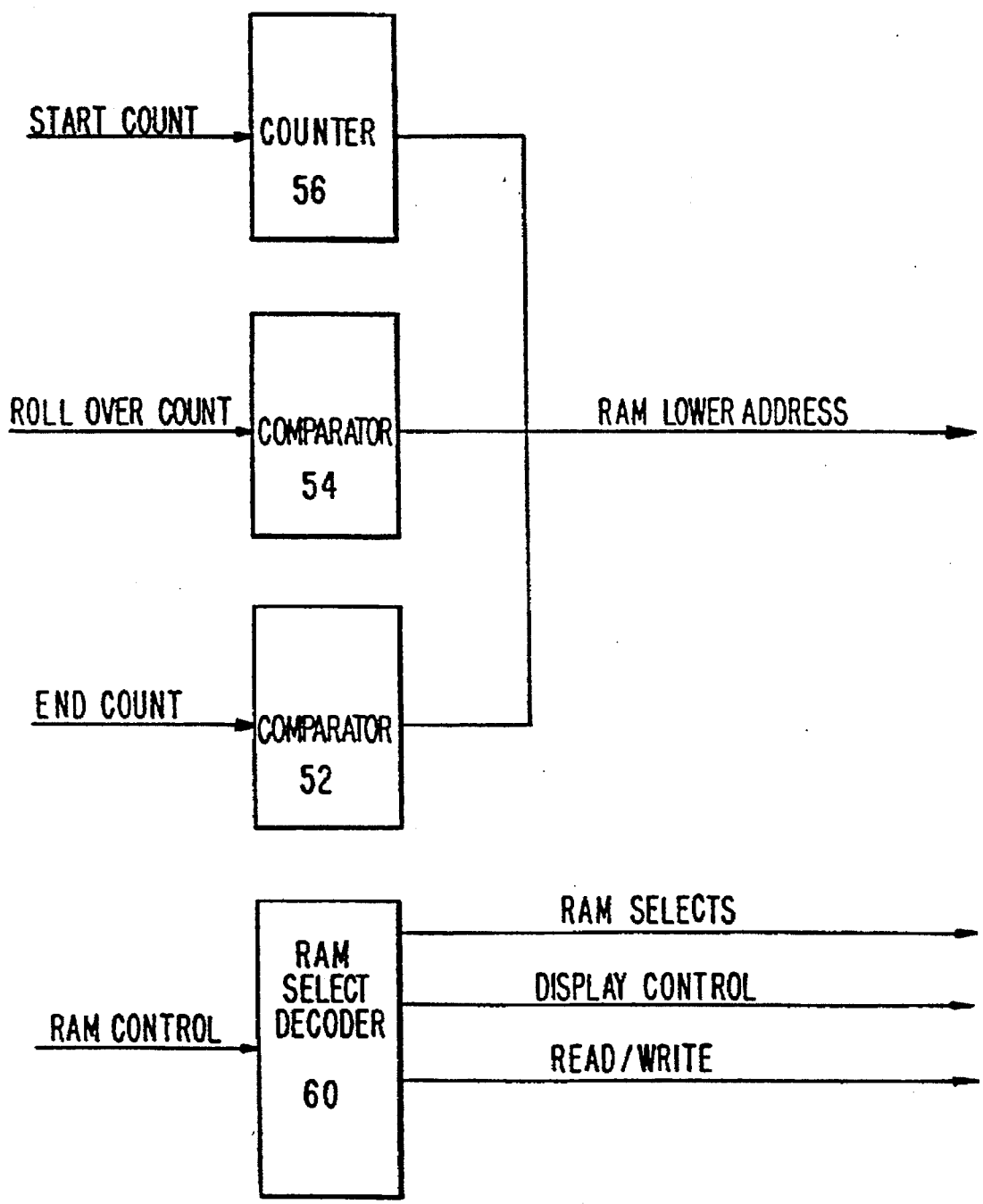
FIG. 13 is a block diagram of the programmable gate array of FIG. 12.

As shown in FIG. 13, the programmable gate array 50 has internal logic which includes a comparator 52, a comparator 54 and a counter 56 which form a nine bit binary counter with programmable start count, end count, and roll over back to zero count. The outputs of the nine bit binary counter form the lower 9 bits of the display memory address lines. These bits correspond to the RAM pixel position within a given display line. Nine bits provide for a possible 512 pixel positions within each row. Using a clock rate of 7.159 MHZ, only 360 of the 512 positions need be used. The counter 56 counts out a pattern of 360 RAM lower addresses during each active video display line. The lower nine address count sequence is the same for each line in a given video image, so it is only necessary to change the sequence if the visual image is to be changed, i.e., scrolled. The pixel count would only be changed during a vertical blanking interval when image display would not be interrupted.

Each line in an image may be different by generating a unique upper display RAM address for each line and forcing pixel data to be read from a different block of memory. The upper address lines are modified and the lower address count sequence restarted during the horizontal blanking interval between each display line.

The nine bit start address, rollover address, and end address components are output on the microcontroller ports during a vertical blanking interrupt. These will remain constant until at least the next vertical interrupt.

During a blanking interval, the microcontroller 20 brings one port line low then high, latching the current line start address present into counter 56. At the beginning of an active line of video, both horizontal drive and vertical drive signals go to a high state, causing the clock enable signal to also go high which enables the counter 56. Each 7.159 MHZ clock cycle to the counter 56 increments the binary output count by one. A valid count sequence will be 360 counts long and can start at any count and end at any count. When the highest lower address in a sequence is reached, the next count must roll over back to zero.

There are nine inputs of comparator 54 which are set to binary output count from the microcontroller 20. When this count value is reached on nine inputs of the comparator 52, the end count line of the comparator 52 goes low, signaling the microcontroller 20 of an end for each display line. To cause a displayed video image to scroll left or right by one pixel, the start, roll over, and end count values must be incremented or decremented by one, respectively.

Figure 14:
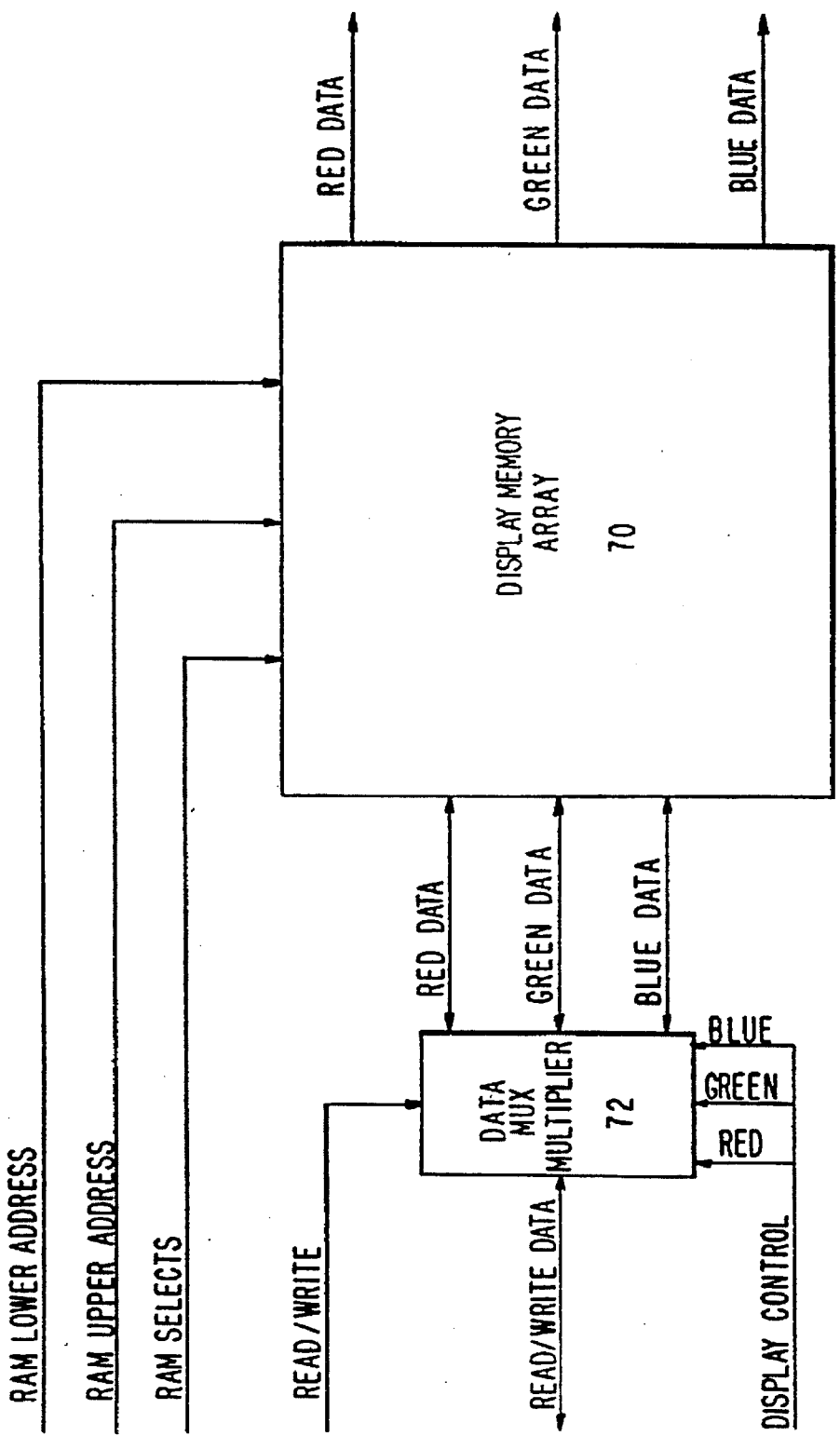
FIG. 14 is a block diagram of the video display RAM of FIG. 12.

As shown in FIG. 14, the display memory section 71 has a multiplexer 72 and a display memory array 70, the latter of which is divided into groups of three colors, i.e. red, green and blue. There may be four banks for each color. Ram select decoder 60 selects one of the four RAM banks and selects one of the three colors. The decoder 60 has outputs which are logically mixed, e.g., by AND gates and OR gates, to generate RAM selects, one RAM select for each display memory array device. With four RAM banks of three colors, there may be 12 display memory array devices or video display RAMS.

Inputs for the decoder 60 come from the 64 port bits of microcontroller 20. RAM bank and color selections occur only once for each video line and are modified only during a horizontal blanking interrupt. In this manner, decoding is effected with respect to whichever one of the twelve video display RAMs is being accessed by the nine lower RAM address lines.

Decoder 60 may be considered to have a Ram bank select decoder and a RAM color select decoder. The RAM color select decoder receives two binary inputs, RGB-LOW and RGB-HIGH from the microcontroller 20 and has provisions to output four binary outputs, namely, R, G, B and RGB signals. The abbreviation RGB designates red, green and blue data. Each of the outputs R, G, B may be input to respective AND gates, with the output RGB being an input also to each of the respective AND gates. The output from each of the AND gates may be an input to respective groups of four OR gates. Each group of four OR gates receives an input from a respective bank select output from the RAM bank select decoder, which receives bank-low and bank-high binary inputs from the microcontroller 20. The output from the OR gates may be received by a respective video display RAM.

Two modes of video display RAM access are recommended. During the normal display mode the Red, Green, and Blue video memory array devices are read at the same time, each bank receiving the same pixel address in parallel. In this mode, the microcontroller 20 places a high signal on inputs RGB-LOW and RGB-HIGH to decoder 60 simultaneously. Output RGB of decoder 60 goes low and so do the three AND gate outputs. In this mode, one RAM chip select line from each of the Red, Green and Blue groups after the OR gates are selected together, allowing parallel display access. A second memory mode is recommended for the microcontroller to randomly read or write any single byte of display memory in the scrolling process. By setting the inputs to decoder 60 so that RGB-LOW and RGB-HIGH are not both high together, only one color R, G, or B will be selected, allowing for access to only one video display RAM at a time.

The display memory array 70 may be composed of twelve Texas Instruments 65256 32K×8 static video display RAM devices. Each RAM has 15 address lines. The lower 9 addresses are generated within the programmable gate array 50 and the upper 6 addresses are generated directly by the microcontroller 20.

The preferred microcontroller 20 is capable of reading or writing only eight bits of data during a single operation. RAM data lines for each of the three color groups are hooked together in parallel in order to drive their respective output circuits during active display periods. Only one RAM chip select in a color group is to be active at a time.

The multiplexer 72 provides a bidirectional read/write data path between the microcontroller 20 and the video memory array. The microcontroller can only communicate with one byte of video ram during any one memory access cycle. A multiplexer 72 composed of three buss transceivers, such as Motorola 74HC245, can be used to prevent data contentions (i.e., simultaneous receipt of data from multiple sources) by selecting data from only one color area of RAM at a time. During active display times, the multiplexer disconnects the microcontroller from video RAM completely so as to avoid interfering with the generation of video.

An input to a transceiver causes an A and B buss to be connected together when in the high state or isolated when in the low state. Data flow direction is controlled by the state of a DIR input pin. Pin inputs of transceivers may be connected to R, G, and B outputs of the programmable gate array logic. The microcontroller 20 may determine which color data buss to select by selecting the proper color select decoder inputs. During an active display mode period, all three inputs R, G, and B are high. This completely isolates the microcontroller 20 from the display Ram bidirectional data buss.

Each video display RAM has a read/write enable line to select whether it is in a read or write mode. The write enable line from all video display RAMs are connected in parallel to a single port line of the microcontroller 20 which sets the read or write state.

The digital to analog converter 7 includes a NTSC video Sync Generator and a triple video RGB digital to analog converter. The entire video display module system timing may be derived from the outputs of a Fairchild 3262B video sync generator. A crystal oscillator of four times the NTSC subcarrier or 14.31818 MHZ is split into a dual phase clock output by gates and fed to inputs of the video sync generator. From this source frequency, the video sync generator 90 generates the NTSC signals of even field, vertical drive, horizontal drive, composite sync, and composite blank. The horizontal and vertical drive signals are used as status interrupts to the microcontroller 20 to initiate the proper software subroutines. The composite blank and composite sync signals are used by the output digital to analog converter 7 to generate sync signals for the analog RGB output.

The triple video RGB digital to analog converter 7 may be a Brooktree BT101 Triple D/A converter, which is used to generate the final analog video signal. Eight bits of red, green, and blue data are fed directly from the display memory outputs. The 14.31818 crystal frequency may be divided in half to provide a pixel clock frequency of 7.159 MHZ. The pixel clock, blanking, and sync signals are mixed with the analog signal generated from the digital RGB data to form an analog RGB video within the converter 7. The converter 7 may directly drive the inputs of a display monitor 1.

It is another embodiment to remove the graphics computer 12 from the feedback loop after image data stored therein is transmitted to the end video module and to thereafter interconnect the end video modules in the cascade. This may be done by use of a simple multi-directional switch or else by the actual physical removal of the graphics computer and then replacement with interconnection between the end video modules. In this manner, the image data being transmitted will be continuously looped around the entire circuit. It is preferred, however, to generate the image data continuously from the graphics computer, to avoid the possibility of glitches which may arise that distort the image data. Thus, distorted images will be terminated to avoid repeatedly looping the distorted images for display around the entire circuit.

It is preferred that the video modules 10 transfer image data between themselves independent of the graphics computer 12, because any number of video modules may be employed without the need to redefine the software on the graphics computer 12 concerning the upper limit of video modules which the graphics computer may handle. However, the graphics computer 12 itself may provide image data to each of the video modules directly; that is, the graphics computer 12 may perform the functions of all the microcontrollers 20 in the video module 10. Scrolling of the image from one video monitor to the next is thoroughly effected through the graphics computer. Each module can also generate its own independent graphics images or color planes under supervisory control of the main computer.

In addition, control command data may be transmitted with the image data which causes the microcontrollers to respond in a particular way, e.g., to decode which image data should be displayed when image data is being transmitted through different channels into the same video module from the graphics computer, i.e., via opposite ends of the cascade. The command data may also be used to vary the color of the display or change the image itself from any given monitor.

Of course, the video monitor may display black and white instead of color; further, the picture on the screen of the video monitor may arise by controlling a cathode ray tube, colored excitable gases, colored lights or any one of a number of display technologies common to televisions with flat screen displays or computer monitors.

While the foregoing description and drawings represent the preferred embodiments of the present invention, it will be understood that various changes and modifications may be made without departing from the spirit and scope of the present invention.

What is claimed is:

1. A video message display system for displaying an overall image distributed across a plurality of video display devices (VDDs) and appearing to be shifting relative to the VDDs in a first direction, comprising:

a plurality of VDDs in a linearly cascaded arrangement;

means for generating image data representing the overall image so that the overall image is larger than the display capacity of a single VDD in the first direction when substantially filling a VDD transversely to the first direction; and means for causing the overall image to appear distributed along the VDDs so that at least three of the VDDs display respective, different portions of the overall image which shift relative to the VDDs and together the VDDs display the shifting overall image as a composite, said causing means comprising:

a plurality of video modules each associated with and controlling the display of at least a respective one of said VDDs; and means for transferring the image data from one of said video modules to the next in succession so that said video modules each cause the associated VDD to display the respective portion of the overall image based on the transferred image data and cause each of the respective portions of the overall image to appear to scroll across the respective VDD and to cascade from one VDD to the next in succession, said transferring means being independent of said generating means when transferring the image data between the video modules.

2. A system as in claim 1, wherein said VDDs are stacked one over the other.

3. A system as in claim 1, wherein said VDDs are arranged side by side.

4. A system as in claim 1, wherein said generating means is in communication with two of said video modules at respective ends of said cascade.

5. A system as in claim 1, wherein said generating means is at an end of said cascade.

6. A video message display system for displaying an overall image distributed across a plurality of video display devices (VDDs) and appearing to be shifting relative to the VDDs in a first direction, comprising:

a plurality of VDDs in a linearly cascaded arrangement;

means for generating image data representing the overall image so that the overall image is larger than the display capacity of a single VDD in the first direction when substantially filling a VDD transversely to the first direction; and means for causing the overall image to appear distributed along the VDDs so that at least three of the VDDs display respective, different portions of the overall image which shift relative to the VDDs and together the VDDs display the shifting overall image as a composite, said causing means comprising:

a plurality of video modules each associated with and controlling the display of at least a respective one of said VDDs;

means for transferring the image data from one of said video modules to the next in succession so that said video modules each cause the associated VDD to display the respective portion of the overall image based on the transferred image data and cause each of the respective portions of the overall image to appear to scroll across the respective VDD and to cascade from one VDD to the next in succession, said transferring means being independent of said generating means when transferring the image data between the video modules; and said VDDs each having pixels and said video modules each including memory means for storing the image data in a matrix of memory, counter means including column and row counters for accessing the image data in said matrix respectively with respect to column addresses and row addresses, means for reassigning at least one of any of said row and column counters so as to change said addresses which are accessible by said counter means, reading means for reading said image data by accessing the image data with said counter means in accordance with said column and row addresses as well as with respect to any reassignment by said reassigning means, and means for sending the image data as read by said reading means to said pixels of an associated one of said VDDs in correspondence with said column and row addresses before and after said reassignment by said reassigning means, each of said VDDs displaying a respective portion of the overall image in response to said sending means and having blanking intervals during which the respective portion of the overall image shifts by at least one pixel in a predetermined direction after each reassignment, said pixels of said VDDs being in correspondence with said column and row addresses of said video modules, respectively.

7. A video message display system for displaying an overall image distributed across a plurality of video display devices (VDDs) and appearing to be shifting relative to the VDDs in a first direction, comprising:

a plurality of VDDs in a linearly cascaded arrangement;

means for generating image data representing the overall image so that the overall image is larger than the display capacity of a single VDD in the first direction when substantially filling a VDD transversely to the first direction; and means for causing the overall image to appear distributed along the VDDs so that at least three of the VDDs display respective, different portions of the overall image which shift relative to the VDDs and together the VDDs display the shifting overall image as a composite, said causing means comprising:

a plurality of video modules each associated with and controlling the display of at least a respective one of said VDDs;

means for transferring the image data from one of said video modules to the next in succession so that said video modules each cause the associated VDD to display the respective portion of the overall image based on the transferred image data and cause each of the respective portions of the overall image to appear to scroll across the respective VDD and to cascade from one VDD to the next in succession, said transferring means being independent of said generating means when transferring the image data between the video modules; and said video modules each including a microcontroller, a display memory array, an asynchronous interface in bidirectional communication with said microcontroller and with at least another of said video modules, a programmable gate array in communication with said microcontroller and with said display memory array, a triple video digital to analog converter in communication with said display memory array and a video clock generator and a video sync generator, said microcontroller being in communication with both of said generators and in bidirectional communication with said display memory array, said triple video digital to analog converter also being in communication with a respective one of said VDDs.

8. A system as in claim 7, wherein said programmable gate array includes two comparators and a counter for providing address information and includes means for decoding color selection to be displayed on a respective one of said VDDs.

9. A method for displaying a shifting overall video image across at least three linearly arranged video display devices (VDDs), each VDD being associated with a respective video module which provides a signal producing the display of the VDD, the method comprising the steps of:

generating image data representing the overall image so that the overall image is larger than the display capacity of a single VDD in a first direction when substantially filling a VDD transversely to the first direction; and causing the overall image to appear distributed across the VDDs in said first direction so that at least three of the VDDs display respective portions of the overall image and together the VDDs display the overall image as a composite, the step of causing comprising the steps of:

transferring the image data in succession from one of the video modules to the next independent of the generating step; and displaying each respective portion of the image on the display VDDs based on the transferred image data from each of the video modules so that each each respective portion of the overall image appears to scroll across the corresponding VDD and from one of the VDDs to the next in succession.

10. A method as in claim 9, further comprising arranging the VDDs side by side.

11. A method as in claim 9, further comprising stacking the VDDs one over the other.

12. A method as in claim 9, further comprising:

supplying the image data from a source to at least one of the video modules, the step of transferring including transferring the image data from one VDD to the next independent of the source.

13. A video message display system for displaying an overall image distributed across a plurality of video display devices (VDDs), said overall image appearing to be shifting relative to the VDDs, in a first direction comprising:

a plurality of VDDs in a linearly cascaded arrangement;

means for generating image data representing the overall image so that the overall image is greater than the display capacity of a single VDD in the first direction when substantially filling a VDD transversely to the first direction;

a plurality of video modules each associated with a respective one of the VDDs, at least three of the video modules causing the associated display VDD to display a respective portion of the overall image wherein a plurality of respective portions are needed to form the overall image, the video modules transferring the image data between each other in succession;

means for scrolling each respective portion of said overall image across the corresponding VDD, so that the overall image appears to travel along the linearly arranged VDDs.

14. A method for displaying a shifting video message on at least three video display devices (VDDs), comprising the steps of:

generating image data representing a composite image which is larger than the display capacity of a VDD in a first direction when substantially filling a VDD transversely to the first direction;

displaying the composite image on at least three linearly cascaded VDDs each controlled by and receiving its video signal from a corresponding video module, each of the VDDs displaying a respective, different portion of the composite image, a plurality of respective portions being needed to form the composite image, the video modules transferring the image data between each other in succession;

scrolling each respective portion of the composite image across the corresponding VDD in the first direction, so that the composite image appears to be traveling along the VDDs.

\* \* \* \* \*